United States Patent
Wong et al.

[11] Patent Number: 5,890,175
[45] Date of Patent: Mar. 30, 1999

[54] DYNAMIC GENERATION AND DISPLAY OF CATALOGS

[76] Inventors: Garland Wong, 4682 Robbins St., San Diego, Calif. 92122; Randall Pipp, 1334 Cynthia La., Carlsbad, Calif. 92008; Eric van Lydegraf, 1823 W. Minister Dr., Cardiff, Calif. 92007

[21] Appl. No.: 719,561

[22] Filed: Sep. 25, 1996

[51] Int. Cl.[6] ........................................................ G06F 3/00
[52] U.S. Cl. ............................................. 707/505; 705/26
[58] Field of Search .................................... 707/501, 505, 707/506, 507, 512, 513, 514, 515, 517, 520, 526, 530, 3, 10, 102; 705/26, 27

[56] References Cited

U.S. PATENT DOCUMENTS

| | | | |
|---|---|---|---|
| 4,992,940 | 2/1991 | Dworkin | 705/26 |
| 5,053,956 | 10/1991 | Donald et al. | 395/560 |
| 5,267,155 | 11/1993 | Buchanan et al. | 707/540 |
| 5,319,542 | 6/1994 | King, Jr. et al. | 705/27 |
| 5,339,392 | 8/1994 | Risberg et al. | 345/333 |
| 5,483,651 | 1/1996 | Adams et al. | 707/1 |
| 5,493,490 | 2/1996 | Johnson | 705/26 |
| 5,619,708 | 4/1997 | Ho | 707/506 |
| 5,649,216 | 7/1997 | Sieber | 707/506 |
| 5,675,752 | 10/1997 | Scott et al. | 345/333 |
| 5,675,784 | 10/1997 | Maxwell et al. | 707/100 |
| 5,721,832 | 2/1998 | Westrope et al. | 705/27 |
| 5,737,591 | 4/1998 | Kaplan et al. | 707/1 |
| 5,740,425 | 4/1998 | Povilus | 707/100 |
| 5,758,329 | 5/1998 | Wojcik et al. | 705/28 |
| 5,765,142 | 6/1998 | Allred et al. | 705/26 |

OTHER PUBLICATIONS

Brochure from Profesional Business Solutions, Inc., Bolts Business On-Line Server, 1996, Carlsbad, CA.
Brochure from Professional Business Solution, Inc., Net-Success Line of Electronic Commerce Products, 1996, Carlsbad, CA.

*Primary Examiner*—Stephen S. Hong
*Attorney, Agent, or Firm*—Fish & Richardson P.C.

[57] ABSTRACT

A computerized method for dynamically generating and displaying a catalog including a plurality of items, each item being classified by at least group information and product information is disclosed. The method allows a merchant user to generate a catalog by classifying new items by entering into pre-defined fields at least group and product information text for each item, and by optionally specifying a multimedia object associated with the new item, where each field optionally has an associated link to a linked object. The user selects a display template which defines a pre-designed catalog page layout having generally designated areas for placement of text and multimedia objects relating to an associated item. After the user inputs information regarding an item into the form fields, the field contents are associated with corresponding areas of the selected template. The field contents are then stored as a part of a page of the catalog. Upon receiving a request to display a page, the stored field contents are retrieved and checked as to whether the requested page includes any multimedia objects. If so, the logical framing for each area designated for placement of multimedia objects is adjusted to accommodate all of the multimedia objects. The retrieved field contents, including any associated links to linked objects, of the requested page are then combined with the display template to generate a display page, which is displayed to a consumer.

9 Claims, 15 Drawing Sheets

Group information    https://www.mallennium.com/mall-admin/admin/mm/admin/review_groups/66

Here's your current list of groups

STORE    /32    /33
[Edit] OR [Delete] group Art —/—31        30
[Edit] OR [Delete] group FBS GROUP
[Edit] OR [Delete] group Specialty Products
[Edit] OR [Delete] group Sports Arena
   [Edit] OR [Delete] group Arena Concerts
      [Edit] OR [Delete] group Sports Wear and Gear
         [Edit] OR [Delete] group Shoes
   [Edit] OR [Delete] group Gulls Hockey
   [Edit] OR [Delete] group Sockers
[Edit] OR [Delete] group USVP
[Edit] OR [Delete] group WCHL      FIG. 3
   [Edit] OR [Delete] group Alaska Gold Kings
   [Edit] OR [Delete] group Anchorage Aces
   [Edit] OR [Delete] group Bakersfield Fog
   [Edit] OR [Delete] group Fresno Falcons
   [Edit] OR [Delete] group Reno Renegades
   [Edit] OR [Delete] group San Diego Gulls

[Add More Groups]  /-34

Group information https://www.mallennium.com/mall-ad...n/mm/review_groups/admin_groups/66

Enter Group Information

Provide "groups" for your products, in order for customers to quickly find the products you sell by association. For example make a group for "women's clothing" and one for "men's clothing" that way customers will find the products they want to buy more easily.

Choose your group template [ standard ▼ ]—41  Samples of the Template Choices

Your Group Name: [                    ]

Your Group Description:

[                                                                     ]

Mark Box ☐ if you plan to include a picture for this group.
Group Picture Name [ PICTURE42 ]  —42

Assign the group. Note (STORE is the top most level)

⦿ STORE

○ ART
   ○ FBS GROUP
   ○ Specialty Products
   ○ Sports Arena —43
      ○ Arena Concerts
         ○ Sports Wear and Gear
            ○ Shoes
     ○ Gulls Hockey
     ○ Sockers
○ USVP
○ WCHL
    ○ Alaska Gold Kings
    ○ Anchorage Aces
    ○ Bakersfield Fog
    ○ Fresno Falcons
    ○ Reno Renegades
    ○ San Diego Gulls

[ Create This Group ]   [ Do Not Create This Group ]   [ Clear Values ]

ABC MUSIC STORE-CLASSICAL    https://www.mallennium.com/Templat...ups/PP/merchant_group_standard.htm

SAMPLE STORE
STANDARD TEMPLATE

ABC MUSIC STORE

CLASSICAL

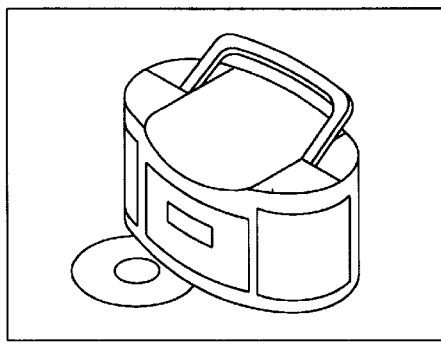

51

50

Click on product link for product description

Products

52

| 0 | ITZHAK PERLMAN – "AMERICAN ALBUM" (cd) : SALE $ 16.85 |
| 0 | ITZHAK PERLMAN – "ART OF" (cd) : SALE $ 39.85 |
| 0 | ITZHAK PERLMAN – "Bits & Pieces"(cd) : SALE $ 16.85 |
| 0 | ITZHAK PERLMAN – "Different Kind of Blues" (cd) : SALE $ 9.85 |
| 0 | ITZHAK PERLMAN – "Encores" (cd) : SALE $ 16.85 |

| Add To/Go To Basket |

[Return to STORE Page]

| Mall | Store | Store Feedback | Mall Inquiries |

FIG. 5

ABC Surf Gear – Hats

SAMPLE STORE
FANCY TEMPLATE https://www.mallennium.com/Templat...groups/PP/merchant_group_fancy.htm

ABC Surf Gear 60

Hats

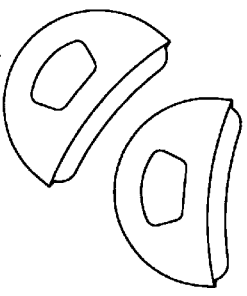
61

These are our ABC Surf Gear hats. Pure cotton comfort with padded headband and cooling vent holes. Adjusts to fit most adults.
COLORS: Purple with Navy bill, Navy with Forest Green bill (Caps–$16.95)

Click on product link for product description

Products 62

| 0 | ABC Surf Hat: $ 21.95 ( $ 16.95 + SH $ 5.00 ) |

Please note color choice when ordering. 1=Maroon/Navy 2=Navy/Forest Green:

[ Add To/Go To Basket ]

[Return to STORE Page]

[ Mall ]  [ Store ]  [ Store Feedback ]  [ Mall Inquiries ]

FIG. 6

Group information   https://www.mallennium.com/mall-ad...D=399&SUBMIT=Go+To+Product+Listing

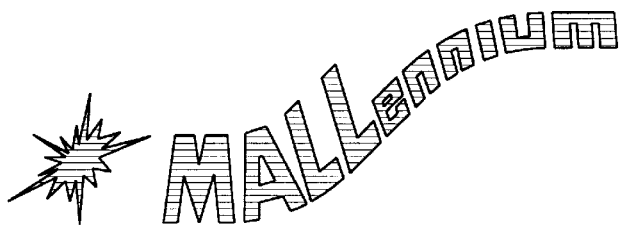

Here's your current list of products

---

[ Create Product ]   in group STORE
- [ Create Product ]⁻⁷² in group Art ⁻⁷¹
  - ⁷⁴⁻[ Edit ] OR [ Delete ]⁻⁷⁵ product BEYOND THE DREAM ⁻⁷³
  - ⁷⁴⁻[ Edit ] OR [ Delete ] product HAVASU FALLS ⁻⁷³
    ⁻⁷⁵
- [ Create Product ] in group FBS GROUP ⁻⁷¹
- [ Create Product ] in group Specialty Products
- [ Create Product ] in group Sports Arena
  - [ Create Product ] in group Arena Concerts
    - [ Create Product ] in group Sports Wear and Gear
    - [ Create Product ] in group Shoes
  - [ Create Product ] in group Gulls Hockey
  - [ Create Product ] in group Sockers
- [ Create Product ] in group USVP
- [ Create Product ] in group WCHL
  - [ Create Product ] in group Alaska Gold Kings
  - [ Create Product ] in group Anchorage Aces
  - [ Create Product ] in group Bakersfield Fog
  - [ Create Product ] in group Fresno Falcons
  - [ Create Product ] in group Reno Renegades
  - [ Create Product ] in group San Diego Gulls

[ Go To Group Selector ]

Group information   https://www.mallennium.com/mall-ad...review_products/admin_products/66

Enter Product Information

Choose your product template [ standard ▼ ] Samples of the Template Choices ⟋ 81

Your Product Belongs to Group: Art
Your Product Name: [ HAVASU FALLS ]
Your Product ID: [ 001 ]
Short Description: [ Beautiful picture of the HAVASU FALLS ]
Your Product Description:
[ The Havasupai are called "the people of the blue-green water." They have li ]

Mark Box ☑ if this product will include a Picture in its description page.
Product Picture Name [ PICTURE6 ]
Standard Price: $ [ 50.00 ]
Shipping & Handling(optional): $ [ 4.50 ]
Product Weight (optional): [ 5 ] [ Ounces ▼ ]
☑ Mark this box if the product is taxable

Promotional Sale Information (optional)
Promotional Sale Price: $ [ 7.00 ]
Valid from [ Jul ▼ ] [ 1 ▼ ] [ 1996 ▼ ] to [ Aug ▼ ] [ 1 ▼ ] [ 1996 ▼ ]
☐ Mark Box If You Need Instructions from the customer concerning this product
Notes Box Instructions
[ ]

Please provide keywords describing your product for the customers who use the product search feature of the MALLennium. (The more keywords and the more precise wording used the better chance your product will be listed for the CUSTOMER) Search keywords: (Optional) (Note: Separate Each Word with a Space)
[ pictures demo ]

[ Update Product ]   [ Reset Values ]
[ Go To Product Listing ]
[ Go To Group Selector ]

FIG. 9

ABC MUSIC STORE https://www.mallennium.com/Templat...s/PP/merchant_product_standard.htm

SAMPLE STORE
STANDARD TEMPLATE

90

ABC MUSIC STORE

MEI 958348(cd):ITZHAK PERLMAN—"Different Kind of Blues" (cd)
92

This CD is only $ 10.95 at the ABC Music Store!

Price: $ 11.95
On Sale Now for $ 10.95 ⟶ 92

Add [ 1 ] (s) To [ Shopping Basket ]

[ Mall ] [ Store ] [ Store Feedback ] [ Mall Inquiries ]

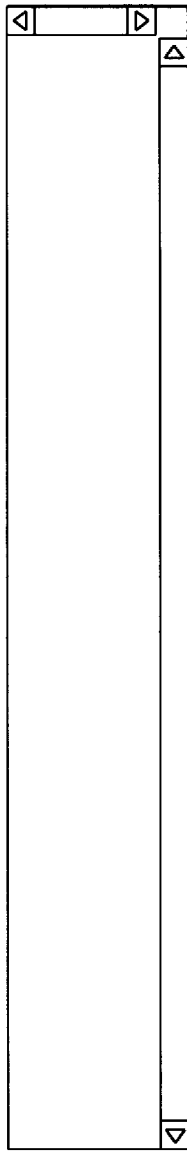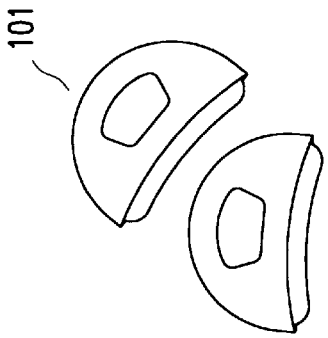
FIG. 10

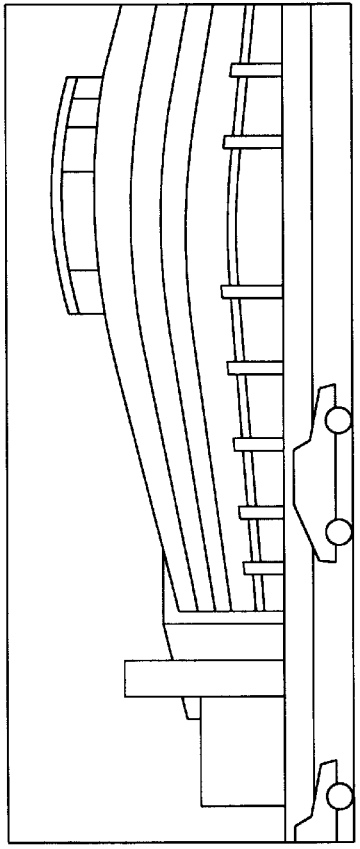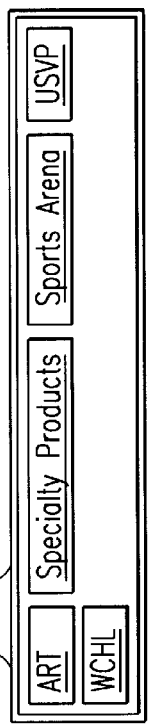
FIG. 11

The MALLennium Demonstration Store-Art    https://www.mallennium.com/mall-bi...Group_Id=399&Basket_id=vd7pmsmJyW

ART
140

Click on product link for product description

Produtcs

143

| 0 | BEYOND THE DREAM: $ 49.50 ($ 45.00+SH $ 4.50) |

BEYOND THE DREAM Poster

141

If this is a gift, please specify what you want the card to say.<BR>:

| 0 | HAVASU FALLS : $ 54.50 ($ 50.00+SH $ 4.50) |

Beautiful picture of the HAVASU FALLS

142

[ Add To/Go To Basket ]

[ Return to STORE Page ]

| Mall | Store | Store Feedback | Mall Inquiries |

DYNAMIC GENERATION AND DISPLAY OF CATALOGS

BACKGROUND OF THE INVENTION

1. Field of the Invention

This invention relates to computer systems, and more particularly to a computerized system for dynamic generation and display of catalog information, especially for the Internet.

2. Description of Related Art

The Internet increasingly has become used for online transaction processing (OLTP). One particular type of OLTP involves electronic purchase of goods. The growth of such transactions in the past few years has been phenomenal. For example, according to the April 1996 issue of the Nielson Report, there were 2.7 million credit card processing terminals, and credit card transactions processed in the U.S. reached 6.3 million.

Considering the expected growth in such transactions with the advent of the Internet, there will be a concomitant demand for computer systems that can process the increased volume of transactions. A major requirement for such systems will be the ability to adapt quickly to market demands.

Traditional OLTP systems have been expensive for three main reason. First, the systems were closed or proprietary. Transactions processing providers typically offered hardware and software from the same vendor. However, limited competition and expensive hardware and operating system software license and maintenance fees made transaction processing cost prohibitive for small users. Second, the use of communication technology, such as leased lines and wide area network, was typically quite costly and thus the cost of establishing an infrastructure for wide availability of OLTP for a particular enterprise was often prohibitive for small users. Third, customized OLTP systems were developed with expensive development tools and programming languages that required a substantial investment in acquisition, personnel, training, and support, again beyond the means of small users.

The Internet has substantially reduced the cost of communication for an OLTP system. Further, the cost of computing has been substantially reduced and operating systems capable of supporting OLTP on standard computing equipment are now available at reasonable cost. However, the cost of implementing a customized OLTP system still remains quite high for small users. Accordingly, it would be desirable to provide an easy to use system that a small user could customize to its needs without having to be trained in OLTP programming or incurring a large expense in hiring trained staff capable of such programming. The present invention provides a system and method for permitting users to implement an OLTP system that meets this need.

SUMMARY OF THE INVENTION

The invention comprises a computerized method for dynamically generating and displaying a catalog comprising a plurality of items, each item being classified by at least group information and product information. The method, which is preferably implemented as a computer program, comprises the following steps in the preferred embodiment:

1) accepting a request from a user to generate a catalog;
2) presenting a form to the user, the form having a plurality of fields for receiving information from the user classifying a new item by entering into the fields at least group information text and product information text for the item, and by optionally specifying a multimedia object associated with the new item, each field optionally having an associated link to a linked object;
3) presenting a plurality of display templates to the user, each display template defining a pre-designed catalog page layout having generally designated areas for placement of text and multimedia objects relating to an associated item;
4) accepting input from the user selecting one of the plurality of display templates;
5) accepting input from the user into the fields of the form;
6) associating the contents of the fields of the form with corresponding areas of the selected display template;
7) storing, as a part of a page of the catalog, the field contents associated with the selected display template;
8) repeating steps 2) through 7) for each item to be entered into the catalog;
9) accepting a request from a consumer to display a page of the catalog;
10) retrieving the field contents of the requested page from storage;
11) determining if the requested page includes any multimedia objects, and if so, then adjusting, in the selected display template, logical framing for each area designated for placement of multimedia objects;
12) combining the retrieved field contents, including any associated links to linked objects, of the requested page with the selected display template to generate a display page;
13) displaying the display page to the consumer.

The method also includes the ability to classify items by "aisle" and "shelf" in order to further organize the catalog.

Advantages of the invention include:

- a flexibility in constructing customized catalogs;
- ease of use and maintenance for non-programmers;
- low storage requirements, since content text and multimedia objects are stored separately from display templates;
- a logical catalog structure that mimics traditional store architectures, making it easy for customers to browse through the catalog without training or disorientation.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 3 is a screen display showing a list of defined groups.

FIG. 4 is a screen display showing a group definition form.

FIG. 5 is a screen display showing a "standard" group display template.

FIG. 6 is a screen display showing a "fancy" group display template.

FIG. 7 is a screen display showing a list of defined products/items associated with groups.

FIG. 8 is a screen display showing a product definition form.

FIG. 9 is a screen display showing a "standard" product display template.

FIG. 10 is a screen display showing a "fancy" group display template.

FIG. 11 is a screen display showing an example Store Front page with selectable button or menu hyperlinks.

FIG. 14 is a screen display showing an example group display page generated in accordance with the invention.

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

The invention is primarily intended for use by merchants that require an easy way of defining and utilizing a catalog displaying products for sale via an electronic network such as the Internet. Accordingly, the following description will use the term "merchant" to mean a user who would define a catalog in accordance with the invention, and the term "consumer" to mean a user who would access such a catalog for browsing and purchase. However, the concepts of the invention are not limited to a traditional merchant/consumer relationship, and can be used for creating catalogs of any sort, such as information-only catalogs.

One advantage of the invention is that each merchant need not have its own server to host a catalog. The catalog can be hosted on a server operated by a service bureau on a subscription basis to the merchant. Thus, multiple merchants may have their individual catalogs hosted by the same service bureau. Each catalog would have its own Internet access identifier and thus would appear from the point of view of a consumer to be unique and dedicated to a particular merchant.

Figure 1:
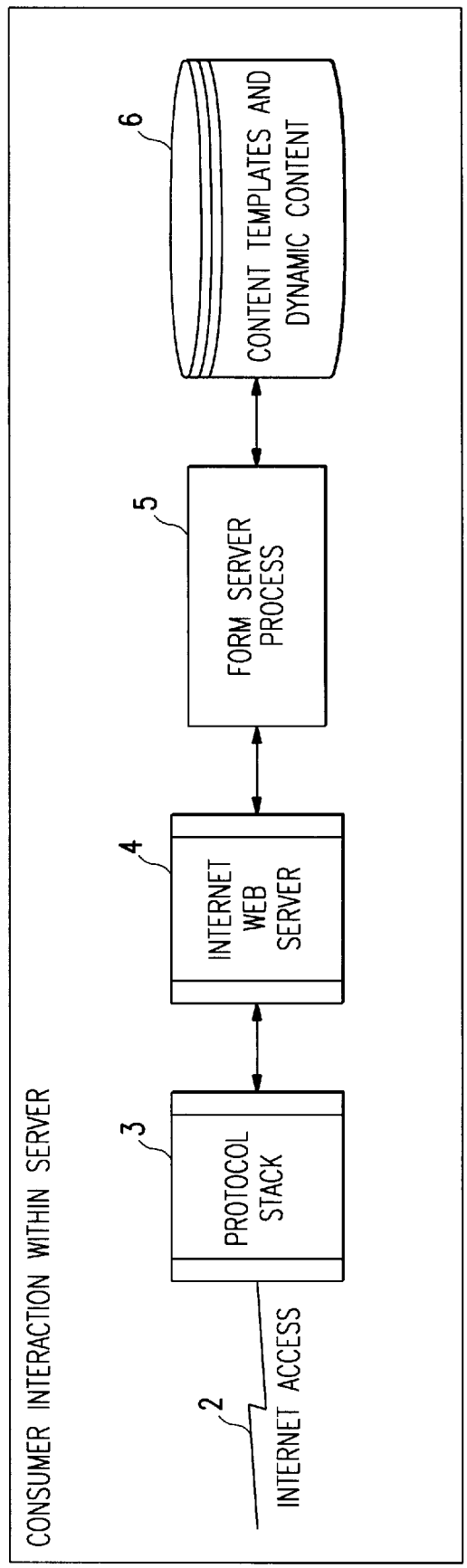
FIG. 1 is a block diagram showing the general architecture of the present invention.

FIG. 1 is a block diagram showing the general architecture of the present invention. The present invention operates in conjunction with a server computer 1 that communicates with the Internet via an access port 2, in conventional fashion. Running in the server 1 is a protocol stack 3, such as the conventional TCP/IP protocol. As is known, the protocol stack handles basic communication functions between the server 1 and client systems accessing the server 1 over the Internet access port 2.

The protocol stack 3 is coupled to an Internet web server 4, which may be, for example, the well known Netscape Commerce Server or Apache HTTP Server. The Internet web server 4 software controls access to the Internet and provides a user interface for such access.

Working through the Internet web server 4 is a form server process 5 in accordance with the invention. The form server process 5 is coupled to a database storage system 6 for storing information obtained by and used by the form server process 5.

Form Server Process

Figure 2:
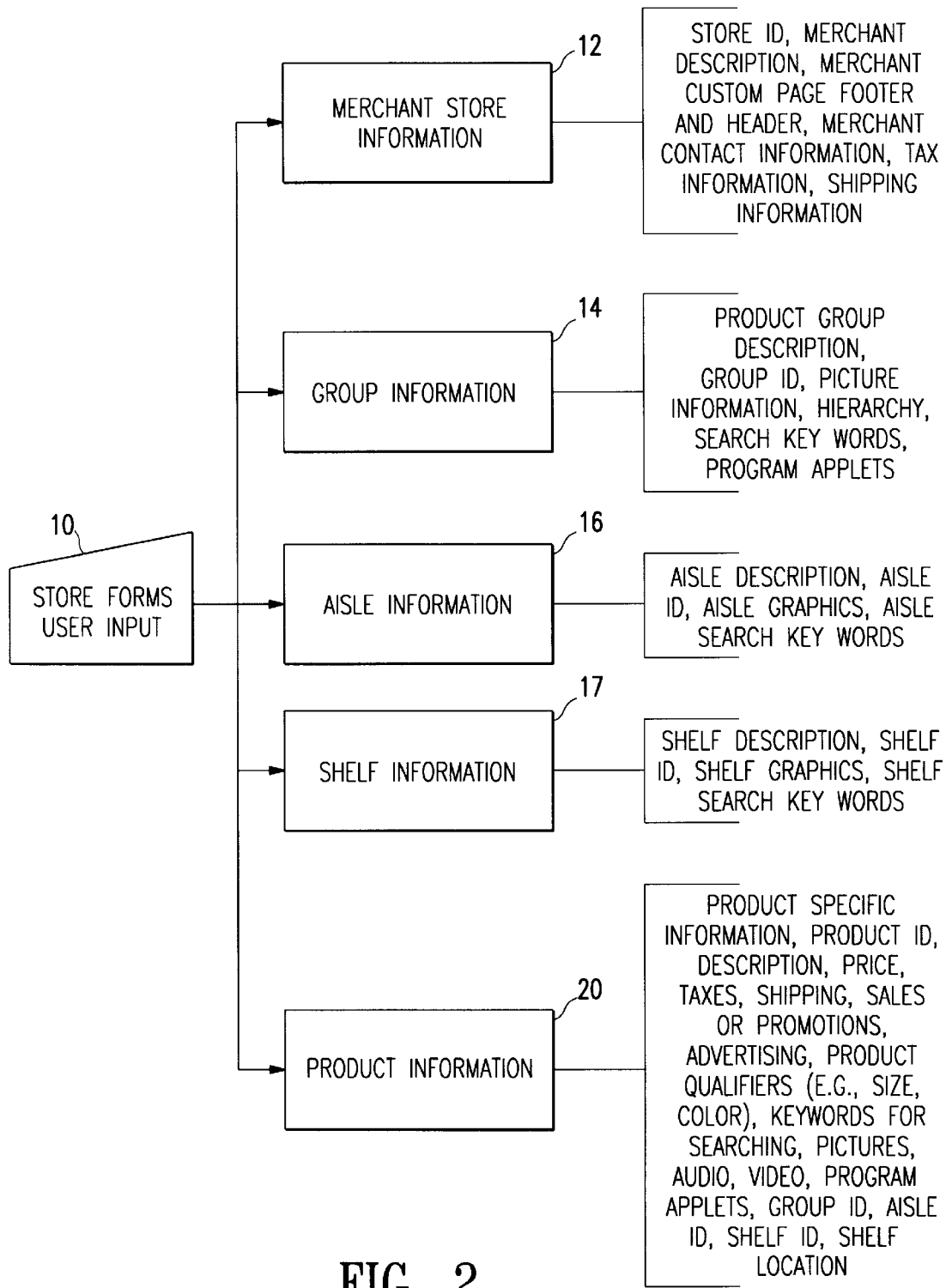
FIG. 2 is a block diagram showing the components of the form-based system of the present invention.

FIG. 2 is a block diagram showing the principal informational components implemented by the form server process 5 of the present invention. User input 10 is entered into any one of several forms as information. For example, a user may input text or multimedia objects (such as graphics images, audio clips, video clips, program applets, etc.) into a Merchant Store Information component 12. Such information relates to the identification and characteristics of the merchant store, and may include, for example, a store ID, merchant description, custom page footer and header, contact information, tax information, shipping information, etc.

One component that is required in the present system is a group information component 14, used for acquiring such information as a product group description, group ID, picture information, hierarchy, search keywords, and associated program "applets". Any item to be entered into the catalog must be associated with group information, to help classify the item in a logical structure that simulates a traditional catalog. Each catalog has at least one group. In the preferred embodiment, the top-most group is called "Store".

An optional subgroup component is an aisle information component 16, used for acquiring such information as an aisle description, aisle ID, aisle graphics, and aisle search keywords. Capturing aisle information permits an item to be classified in a manner that helps simulate a retail store, and thus help orient a consumer and provide a way for a consumer to locate items in the catalog.

Another optional subgroup component is a shelf information component 17, used for acquiring such information as shelf description, shelf ID, shelf graphics, and shelf search keywords. Like aisle information, shelf information further allows finer classification of items to aid consumers in locating particular items in a catalog.

A second required component is a product information component 20, used for acquiring information for each item to be entered into a catalog. Such product information may include, for example, product-specific information, product ID, description, price, taxes, shipping, sales or promotions, advertising, product qualifiers (e.g., size, color, etc.), search keywords, pictures, audio, video, program applets, etc. Also associated with each item via the product information component 20 is catalog location information, such as a group ID, aisle ID, shelf ID, and location on a shelf.

Additional optional subgroup components for similarly organizing items in the catalog can be included, and/or "aisles" and "shelves" can be renamed to reflect other store models. For example, "department" or "boutique" components can be included, and "aisles" could be named "sections" or "rows" and "shelves" could be named "counters" or "racks". Further, if desired, other information may be captured for each item in the various components.

To generate a catalog, a user must define at least one page for the catalog. Each page contains at least one product item for which product information must be entered by the merchant. Further, each item must be associated with a group, although a catalog may comprise a single group. Accordingly, group information must be entered for each item.

To perform these functions, in the preferred embodiment, a merchant would access a service provider, preferably only after providing suitable security information. The merchant is provided with a suitable form for defining a group for a catalog through the group information component 14. FIG. 3 is a screen display showing a list of defined groups by way of a form 30. (The display forms depicted throughout the figures are by way of example only, and may be laid out in any desired fashion. The forms are preferably created with a macro language, such as the HyperText Markup Language—HTML—or JAVA). Importantly, the merchant user is not required to know how to create a form of the type presented, but is instead presented with a form for creating catalog groups and pages.

In the preferred embodiment, each group 31 is associated with an Edit button 32 and Delete button 33. An "Add More Groups" button 34 is also displayed. Initially, the only group is "STORE" (which cannot be deleted but could be renamed). If the "Add More Groups" button 34 is selected, another form is displayed to allow a merchant to select a template for the group, provide a description, and enter any other necessary or desired information. FIG. 4 is a screen display showing a group definition form 40 having a template selection control 41 and a graphics image assignment control 42 for associating a graphical image with the group. The assignment control 42 can alternatively be used for assigning multimedia objects and is not limited to graphics.

Each new group must be assigned to the top level (STORE) or under an existing group as a subgroup. The form 40 preferably provides a graphical "radio button" hierarchical "tree" 43 to make such assignment intuitive and easy.

Information fields can be provided as desired to capture information such as group ID, search keywords, and associated program "applets". Some of the information, such as group ID, may be automatically generated if desired.

The template selection control 41 allows a merchant to pick a "look and feel" for a catalog by allowing each group to have an assigned display template. FIG. 5 is a screen display showing a "standard" group display template 50. As shown, a graphical image 51 is associated with the group, and a table 52 lists product items. FIG. 6 is a screen display showing a "fancy" group display template 60. Again, a graphical image 61 is associated with the group, and a table 62 lists product items.

In the preferred embodiment, if an Edit button 32 is selected, a form similar to the group definition form 40 in FIG. 4 is displayed, with appropriate controls for accepting or rejecting edit changes.

Note that the input of the field contents is done in a form 40 separate from the display template 60. Thus, the same group information can be presented in different manners depending on selection of display template. This allows a merchant to enter data about a group in a uniform manner. If the data entry form looked like a display template, then the various data items generally would be in different places with different templates, causing confusion. However, a link (e.g., a field number) exists between each field in the selected display template 60 and a corresponding field in the input form 40. Each field of a display template 60 is, in essence, a variable, to which the contents of a data input field from the group definition form 40 can be assigned as data content. On the other hand, note that some fields in the group definition form 40 may not have corresponding fields in the selected display template 60. Such "hidden" fields may be used for a variety of purposes, such as permitting conditional display of information in the display template depending on consumer input during use of the catalog.

After a group is defined, the contents of the fields of the input form, including any links to other objects, are stored as a "group page" in a database storage system 6.

In similar fashion to definition of a group, logical subgroups such as aisles and shelves can be defined to classify a product or item in order to further organize the catalog. For example, the aisle information component 16 would be used for acquiring such information as an aisle description, aisle ID, aisle graphics, and aisle search keywords, and the shelf information component 17 would be used for acquiring such information as shelf description, shelf ID, shelf graphics, and shelf search keywords. Also in similar fashion, subgroup pages, such as "aisle pages" and "shelf pages", are created and stored in a database storage system 6.

Once groups and any subgroups are created, a merchant can add items to those structures. In the preferred embodiment, the merchant enters a product or item entry mode via a menu selection, and is then provided with a suitable form for defining an item for a page of the catalog by the product information component 20. FIG. 7 is a screen display of a form 70 showing a list of defined products/items associated with groups. In the preferred embodiment, each group 71 is associated with an "Create Product" button 72, and each product 73 is associated with an Edit button 74 and Delete button 75.

If a "Create Product" button 72 is selected, another form is displayed to allow a merchant to enter information about the product. FIG. 8 is a screen display showing a product definition form 80 having a template selection control 81 and a graphics image assignment control 82 for associating a graphical image with the product. Multiple additional fields may be provided to capture such information as product ID, description, price, taxes, shipping, sales or promotions, advertising, product qualifiers (e.g., size, color, etc.), search keywords, etc. In addition, entries may be made in optional fields as links to such multimedia objects as graphics images, audio clips, video clips, program applets, etc. Also associated with each item via the product information component 20 is catalog location information, such as a group ID, aisle ID, shelf ID, and location on a shelf. The same or a similar form 80 may be used for editing existing product definitions.

Similar to groups, the template selection control 81 in the form 80 of FIG. 8 allows a merchant to pick a "look and feel" for a product definition by allowing each product to have an assigned display template. FIG. 9 is a screen display showing a "standard" product display template 90. As shown, various fields 92 are provided to list information about the product. FIG. 10 is a screen display showing a "fancy" group display template 100. As shown, a graphical image 101 is associated with the group, and various fields 102 are provided to list information about the product.

As with groups, the input defining field contents is done in a form 80 separate from the display template 90. Thus, the same product information can be presented in different manners depending on selection of display template. This allows a merchant to enter data about a product in a uniform manner. If the data entry form looked like a display template, then the various data items generally would be in different places with different templates, causing confusion. Again, a link (e.g., a field number) exists between each field in the selected display template 90 and a corresponding field in the input form 80. Again, some fields in the input form 80 may not have corresponding fields in the selected display template 90.

After a product is defined, the contents of the fields of the input form, including any links to other objects, are stored as a part of a "product page" in a database storage system 6. In the preferred embodiment, each product page may have more than one product assigned to it, just as a conventional catalog may have multiple items per physical page.

Once all groups, subgroups (e.g., aisles and shelves), and products have been defined by a merchant, the catalog may be accessed and used by a consumer. A consumer accesses an Internet world wide web page for the merchant (or service provider for the merchant) via a conventional Universal Resource Locator (URL) address, in conventional fashion. An initial Store Front page is displayed to the consumer. FIG. 11 is a screen display showing an example Store Front page with selectable button or menu "hyperlink" fields 110. The consumer would initially select (for example, with a pointing device such as a mouse) one such hyperlink 110, which preferably corresponds to a group at this level. The form server process 5 of the invention then processes the user's input as described below with respect to FIG. 12.

Figure 12:
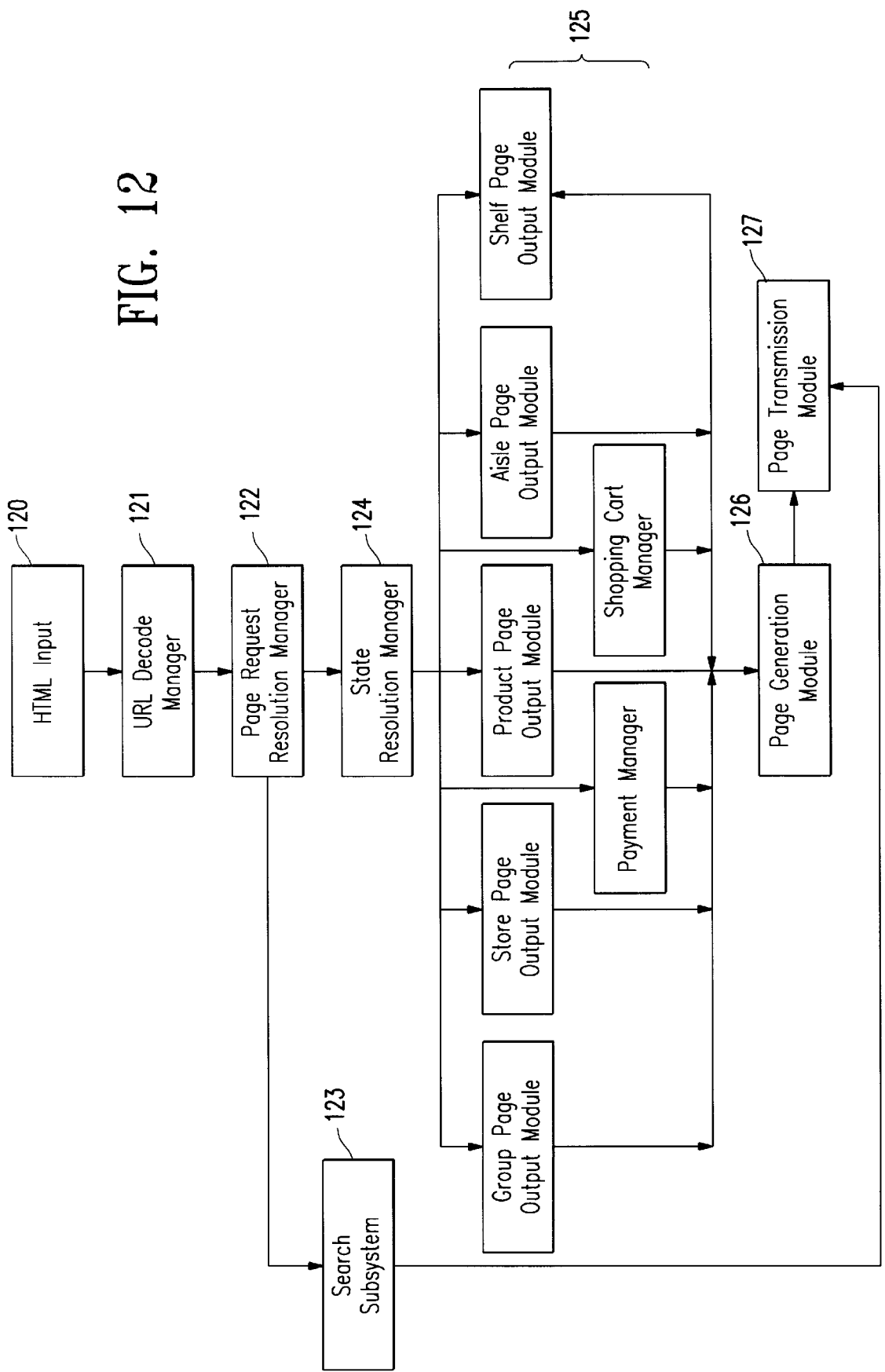
FIG. 12 is a flow chart diagram of the preferred method of accessing a catalog in accordance with the invention.

FIG. 12 is a flow chart diagram of the preferred method of accessing a catalog in accordance with the invention. Once the consumer selects a hyperlink, thereby generating an input request (e.g., HTML input) (STEP 120), the form server process 5 uses conventional means to decode the input into a URL indicating the selected display object (STEP 121). The URL is then applied to a Page Request Resolution Manager that uses the URL to access a table of the pages stored in a database storage system 6 (STEP 122). If the page is not found in the table, the system may invoke a search subsystem that provides a search query form to the user or executes a "similarity" search, in known fashion (STEP 123).

If the page is found in the table, associated page information in the table is examined by a State Resolution Manager to determine the page type (e.g., group, aisle, shelf, product, etc.) (STEP 124). The appropriate output module(s) are then called, each of which then queries the database storage system 6 for the stored pages of all of the content fields associated with the specified page (STEP 125). (Shown in the example in FIG. 12 are several modules, such as a payment manager module and shopping cart manager module, that provide additional functions not pertinent to the essence of the invention.) The retrieved content is then supplied to a Page Generation Module, which generates a display page from the content and the display template associated with each stored page (STEP 126). The display page is then transmitted to the consumer by a Page Transmission Module, in conventional fashion (STEP 127).

Thus, for a group page selected by the consumer, the database storage system 6 is queried for the information content to be displayed on the display template associated with that group page. In addition, subgroups and product pages that have the corresponding group ID would be retrieved so that one or more subgroups and/or products are displayed on that group page.

Figure 13:
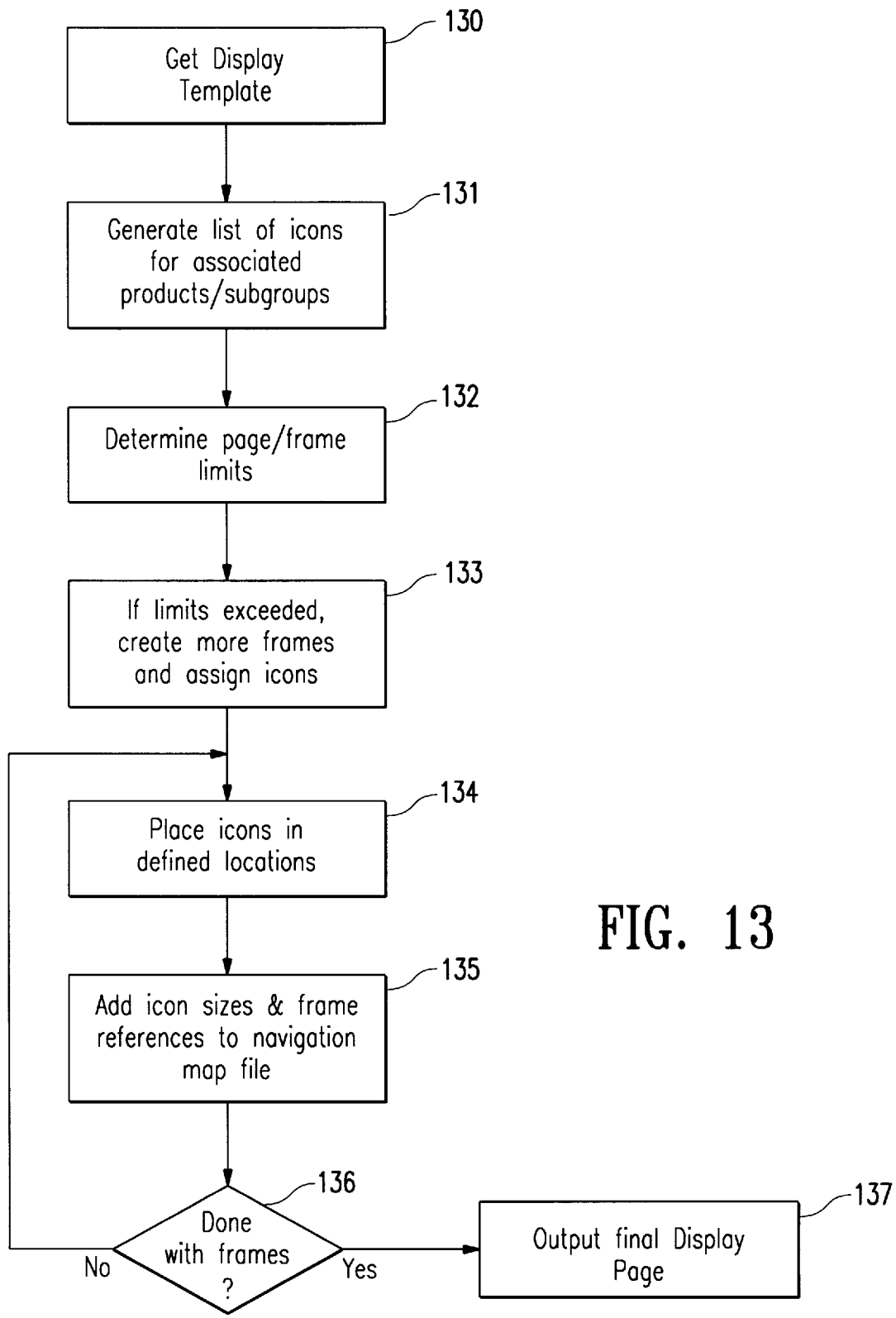
FIG. 13 is a flow chart showing the preferred method of combining stored data field contents with a display template.

FIG. 13 is a flow chart showing the preferred method of combining stored data field contents with a display template to generate a display page. In general, stored data field contents are assigned to the corresponding variable in the display template, in known fashion. However, one problem in such combining is that more subgroups or products may be assigned to a group page than can be displayed at one time. For example, FIG. 5 shows a screen display having a table 52 that lists a number of product items. Since many more products may exist than can be shown at once, the invention provides a method of automatically creating a sequence of "logical frames" for the assigned items and automatically updates "hotspot" controls in the display template to allow access to that sequence. Accordingly, the form server process 5 provides a graphics construction module within the Page Generation Module of FIG. 12 to accomplish these functions.

Referring to FIG. 13, to combine stored data field contents with a display template, the display template associated with the requested page is fetched from storage (STEP 130). (In this example, the display template is for a group. The description below applies to subgroup and product display templates.)

The pages for products and subgroups that have the corresponding group ID are examined for multimedia objects, represented by "icons", to be inserted into the retrieved display template; a list of such icons is generated in the preferred embodiment (STEP 131). The capacity of the display area ("frame") for displaying icons is determined from the characteristics of the display template (STEP 132). If that capacity is less than the number of icons to display, additional logical frames are created by the system to accommodate the number of retrieved icons, and icons are assigned (e.g, in order of access, pre-defined order, alphabetical order, etc.) to logical frames (STEP 133).

For a frame, icons are placed in pre-defined locations indicated on the display template until the frame is filled or the icons assigned to that frame are all placed (STEP 134). Any desired placing rules can be used. Note that the assignment of icons to frames may be recursive, in that subgroups within a group that have associated icons may have to have such icons placed in frames as well.

For the frame, the icon dimensions are added, in known fashion, to a navigation map file so that an associated URL is created that is responsive to clicking or selection of an icon on the final display page (or "imagemap") to be displayed to the consumer (STEP 135). Note that the navigation map file must be keyed by a frame reference, since a click on a frame of the display page will activate different URL's depending on which frame is currently displayed.

If additional frames require generation (STEP 136), then the process loops to STEP 134. Otherwise, the final display page is output to the server for transmission to the consumer (STEP 137).

FIG. 14 is a screen display showing an example group display page 140 generated in accordance with the invention. The group display page 140 shown displays two product references 141, 142 in a table 143. A consumer can request further information about either product by clicking on the product references 141, 142 to activate the associated link.

Figure 15:
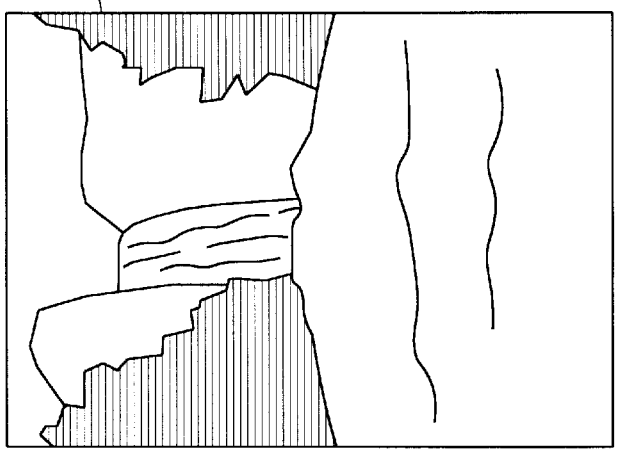
FIG. 15 is a screen display showing an example product display page generated in accordance with the invention.

FIG. 15 is a screen display showing an example product display page 150 generated in accordance with the invention. The product display page 150 shown includes a graphical image 151 and various information items 152 about the product. The product display page 150 is a combination of the associated product page information originally input by the merchant with the associated display template selected by the merchant for that product. In the example shown, a consumer can select the product by clicking on a "Shopping Basket" button 153 as well as specify quantity by entering a number in an edit control 154. Other controls and data fields may be provided in the display template as well, such as size, color, model, etc. The "Shopping Basket" collects information (including multimedia objects) about each product ordered by the consumer and allows the consumer to review each selected item. A payment module permits the consumer to pay for the ordered items via electronic means, such as by credit card payment.

Thus, the invention provides flexibility in constructing customized catalogs; is easy to use by non-programmers; has low storage requirements, since content text and multimedia objects are stored separately from display templates; and provides a logical catalog structure that mimics traditional store architectures, making it easy for customers to browse through the catalog without training or disorientation.

Implementation

The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language, or a combination of both.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A computerized method for dynamically generating and displaying a catalog comprising a plurality of items, each item being classified by at least group information and product information, the method comprising the steps of:
    (a) accepting a request from a user to generate such a catalog;
    (b) presenting a form to the user, the form having a plurality of fields for receiving information from the user classifying a new item by entering into the fields at least group information text and product information text for the item, and by optionally specifying multimedia objects associated with the new item, each field optionally having an associated link to a linked object;
    (c) presenting a plurality of display templates to the user, each display template defining a pre-designed catalog page layout having generally designated areas for placement of text and multimedia objects relating to an associated item;
    (d) accepting input from the user selecting one of the plurality of display templates;
    (e) accepting input from the user into the fields of the form;
    (f) associating the contents of the fields of the form with corresponding areas of the selected display template;
    (g) storing, as a part of a page of the catalog, the field contents associated with the selected display template;
    (h) repeating steps (b) through (g) for each item to be entered into the catalog;
    (i) accepting a request from a consumer to display a page of the catalog;
    (j) retrieving the field contents of the requested page from storage;
    (k) determining if the requested page includes any multimedia objects, and if so, then adjusting, in the selected display template, logical framing for each area designated for placement of multimedia objects;
    (l) combining the retrieved field contents, including any associated links to linked objects, of the requested page with the selected display template to generate a display page;
    (m) displaying the display page to the consumer.

2. The method of claim 1, wherein each item is further classified by at least aisle information, and wherein the form further includes at least one field for receiving information from the user classifying a new item by entering into such at least one field aisle information text.

3. The method of claim 2, wherein each item is further classified by at least shelf information, and wherein the form further includes at least one field for receiving information from the user classifying a new item by entering into such at least one field shelf information text.

4. A computerized system for dynamically generating and displaying a catalog comprising a plurality of items, each item being classified by at least group information and product information, the system comprising:
    (a) means for accepting a request from a user to generate such a catalog;
    (b) means for presenting a form to the user, the form having a plurality of fields for receiving information from the user classifying a new item by entering into the fields at least group information text and product information text for the item, and by optionally specifying multimedia objects associated with the new item, each field optionally having an associated link to a linked object;
    (c) means for presenting a plurality of display templates to the user, each display template defining a pre-designed catalog page layout having generally designated areas for placement of text and multimedia objects relating to an associated item;
    (d) means for accepting input from the user selecting one of the plurality of display templates;
    (e) means for accepting input from the user into the fields of the form;
    (f) means for associating the contents of the fields of the form with corresponding areas of the selected display template;
    (g) means for storing, as a part of a page of the catalog, the field contents associated with the selected display template;
    (h) means for accepting a request from a consumer to display a page of the catalog;
    (i) means for retrieving the field contents of the requested page from storage;
    (j) means for determining if the requested page includes any multimedia objects, and if so, then adjusting, in the selected display template, logical framing for each area designated for placement of multimedia objects;
    (k) means for combining the retrieved field contents, including any associated links to linked objects, of the requested page with the selected display template to generate a display page;
    (l) means for displaying the display page to the consumer.

5. The system of claim 4, wherein each item is further classified by at least aisle information, and wherein the form further includes at least one field for receiving information from the user classifying a new item by entering into such at least one field aisle information text.

6. The system of claim 5, wherein each item is further classified by at least shelf information, and wherein the form further includes at least one field for receiving information from the user classifying a new item by entering into such at least one field shelf information text.

7. A computer program, residing on a computer-readable medium, for dynamically generating and displaying a catalog comprising a plurality of items, each item being classified by at least group information and product information, the computer program comprising instructions for causing a computer to:

(a) accept a request from a user to generate such a catalog;

(b) present a form to the user, the form having a plurality of fields for receiving information from the user classifying a new item by entering into the fields at least group information text and product information text for the item, and by optionally specifying multimedia objects associated with the new item, each field optionally having an associated link to a linked object;

(c) present a plurality of display templates to the user, each display template defining a pre-designed catalog page layout having generally designated areas for placement of text and multimedia objects relating to an associated item;

(d) accept input from the user selecting one of the plurality of display templates;

(e) accept input from the user into the fields of the form;

(f) associate the contents of the fields of the form with corresponding areas of the selected display template;

(g) store, as a part of a page of the catalog, the field contents associated with the selected display template;

(h) repeat actions (b) through (g) for each item to be entered into the catalog;

(i) accept a request from a consumer to display a page of the catalog;

(j) retrieve the field contents of the requested page from storage;

(k) determine if the requested page includes any multimedia objects, and if so, then adjust, in the selected display template, logical framing for each area designated for placement of multimedia objects;

(l) combine the retrieved field contents, including any associated links to linked objects, of the requested page with the selected display template to generate a display page;

(m) display the display page to the consumer.

8. The computer program of claim 7, wherein each item is further classified by at least aisle information, and wherein the form further includes at least one field for receiving information from the user classifying a new item by entering into such at least one field aisle information text.

9. The computer program of claim 8, wherein each item is further classified by at least shelf information, and wherein the form further includes at least one field for receiving information from the user classifying a new item by entering into such at least one field shelf information text.

* * * * *